United States Patent [19]
Zeppmeisel

[11] 4,089,361
[45] May 16, 1978

[54] REEL APPARATUS FOR BACKGROUND SHEET

[76] Inventor: Heinz Zeppmeisel, 2 Bullerteichstrasse, D 4535 Westerkappeln, Germany

[21] Appl. No.: 717,274

[22] Filed: Aug. 24, 1976

[51] Int. Cl.² .............................................. A47H 1/00
[52] U.S. Cl. .................................... 160/120; 160/241
[58] Field of Search ............... 160/120, 241, 266, 267; 40/83, 84, 85; 242/58

[56] References Cited
U.S. PATENT DOCUMENTS

| | | | |
|---|---|---|---|
| 638,744 | 12/1899 | Nelson | 160/120 |
| 1,375,493 | 4/1921 | Drew | 40/83 |
| 1,614,957 | 1/1927 | Holloway et al. | 40/83 |
| 1,908,989 | 5/1933 | Lahey et al. | 160/120 |

*Primary Examiner*—Peter M. Caun
*Attorney, Agent, or Firm*—Lawrence E. Laubscher

[57] ABSTRACT

A backdrop display apparatus is disclosed for selectively displaying one of plurality of flexible backdrop sheets wound on backdrop supply rollers, respectively, including a stationary bracket device to which the backdrop supply rollers are rotatably connected in parallel, generally horizontally arranged relation, in combination with at least one first guide roller arranged parallel with, adjacent and at a lower elevation than one end roller of the supply rollers, whereby the backdrops unwound from the remaining ones of the supply rollers are guided by the first guide roller for suspension adjacent the position at which a backdrop sheet is suspended from the said one end roller. Second guide rollers are associated with the said remaining supply rollers to guide the backdrop sheets during transport toward the first guide roller in spaced relation to the other backdrop supply rollers. Transverse rods are secured as weights to the free ends of the backdrop sheets to tension the same.

4 Claims, 4 Drawing Figures

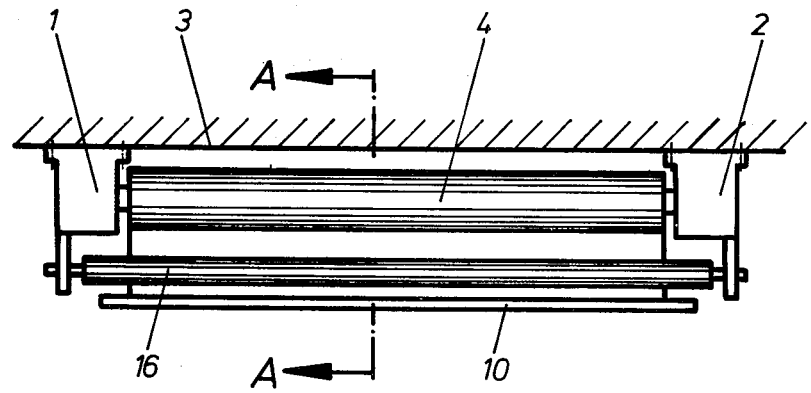
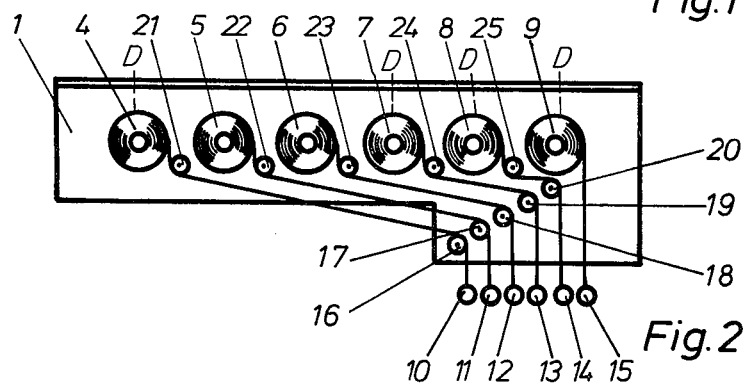
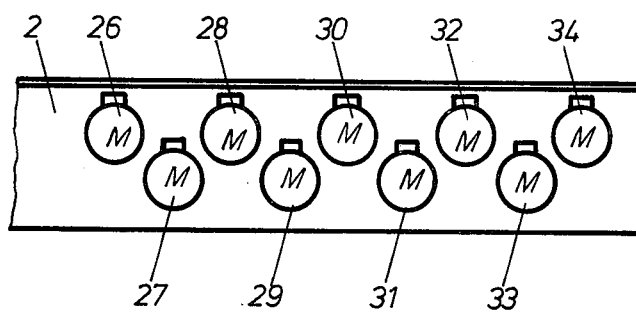

REEL APPARATUS FOR BACKGROUND SHEET

BACKGROUND OF THE INVENTION

This invention relates to stationary roll-up mechanisms for backdrops.

A stationary roll-up mechanism has been proposed, particularly for use in photographic studios, comprising brackets secured to the studio ceiling or wall and receiving rollers containing unwindable backdrops, the free end of each backdrop being provided with a transverse rod acting as a weight.

In that particular roll-up mechanism secured to the photographic studio ceiling or wall, only a maximum of three backdrop rollers can be accommodated. At the present time there are available backdrops in fifty different reflection-free shades, and any studio professing to be well equipped should have most of them in stock. This means that the rollers, which are certainly not light in weight, constantly have to be interchanged and there must be suitable storage room available for the rollers that are not required.

SUMMARY OF THE INVENTION

An object of the invention, therefore, is to accommodate in a stationary roll-up mechanism as many rollers containing a backdrop or similar decorative material as possible, and to enable them to be immediately accessible while avoiding complicated rewinding operations. This object is not achieved simply by accommodating a large number of rollers in the mechanism. These rolled-up backdrops have a diameter of about 100 mm, requiring 10 mm for free clearance so that 20 rollers require a length of more than 2 meters. This, in turn, means that the backdrop has to be at a distance of more than 2 meters from the camera, and in most studios this is impossible for reasons of space.

To obviate this disadvantage, according to the invention, the backdrops unwound from the foremost supply rollers are first guided in the direction of the rear roller and can then drop down over a first guide roller, adjacent the rearmost roller, whereby regardless of which of the rollers is then unwound, the backdrop is always at the same or substantially the same distance from the camera. In a roll-up mechanism according to the invention, transverse weight rods extend as far as the brackets, second guide rollers being mounted rotatably on the brackets in association with all supply rollers other than the rearmost supply roller.

It has been found that this mechanism enables up to ten backdrop rollers to be accommodated without difficulty. If there is a larger number of rollers, than according to another feature of the invention the mechanism is so arranged that a conveyor belt provided with drivers is provided at some distance below and parallel with each bracket and another deflecting roller which connects the two conveyor belts in respect of drive is provided in the region of the first roller containing a backdrop, and the drive of at least every second and additional roller containing a backdrop is adapted to be coupled in synchronism to the drive for the conveyor belts.

Space is also saved if the rollers containing the backdrops are disposed in two rows but in an offset arrangement in the brackets.

In order to avoid transitional edges, the backdrop should also form the floor for the subject being photographed, so that according to a further feature of the invention a guide rail for the extended transverse weight rods is disposed pivotally beneath each conveyor belt, each guide rail extending forwardly at an angle and as far as the floor from the region of its deflecting roller. If a floor of the same colour is required at the same time, therefore, the two guide rails are swung in which case the extended transverse rods slide forwardly thereon while the backdrop sags between the rails until it reaches the floor. For rolling up, the backdrop is the first to lift until it starts to pull its transverse rod up on the guide rails again.

The roll-up mechanism according to the invention can be arranged for fully automatic operation very simply according to another feature of the invention if it incorporates drives for the rollers containing a backdrop and a drive for the conveyor belts which are reversibly-polarity geared motors, the motor for the conveyor belts being automatically co-actuated when one of the motors for the rollers is actuated. Such a mechanism of this kind can then be provided with limit switches, and switching on can be under remotecontrol using known means.

BRIEF DESCRIPTION OF THE FIGURES

In order that the invention may be well understood there will now be described some embodiments, thereof, given by way of example only, reference being had to the accompanying drawings, in which:

FIG. 1 is a front elevation of a roll-up mechanism;

FIG. 2 is a section along line A—A of FIG. 1; and

FIGS. 3 and 4 are sectional views illustrating first and second modifications of the apparatus of FIG. 1, respectively.

DETAILED DESCRIPTION

Figure 4:
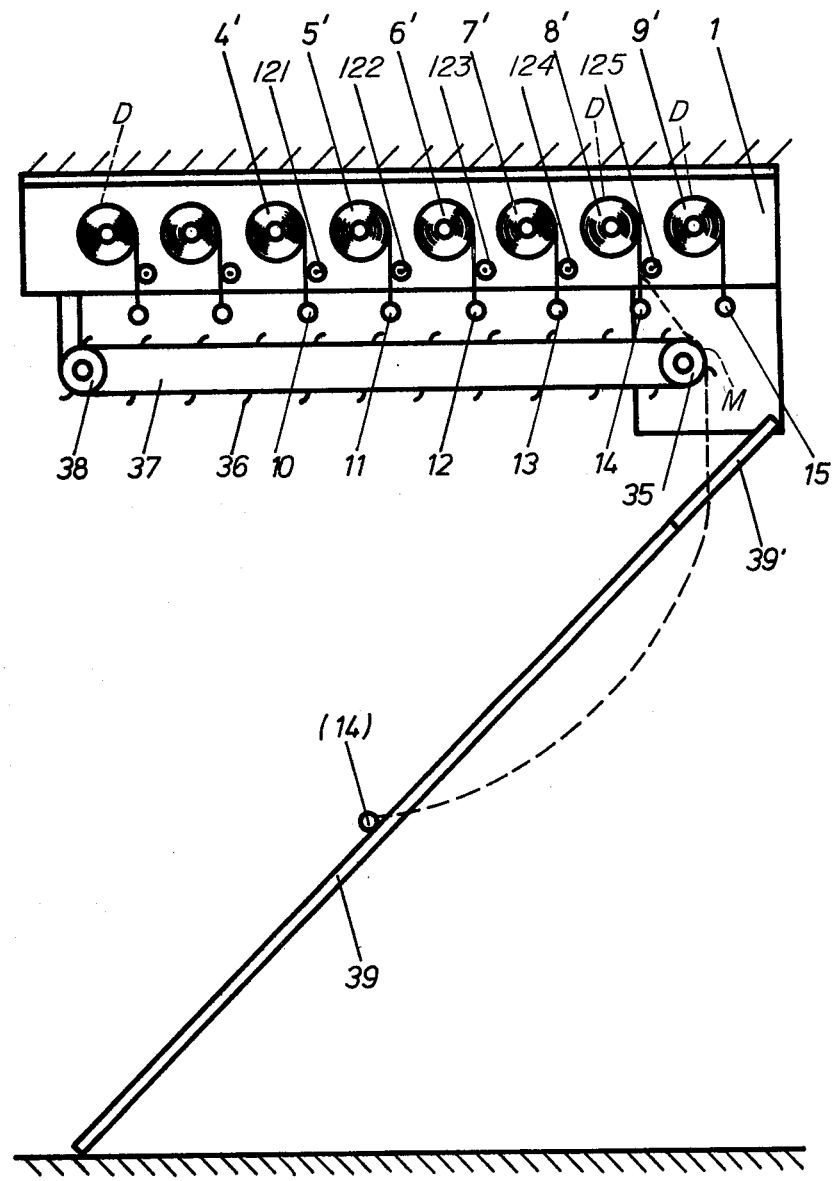

Referring to FIG. 1, two brackets 1 and 2 are secured to a ceiling 3, for example of a photographic studio, and between them backdrop supply rollers 4, 5, 6, 7, 8 and 9 (FIG. 2) for the backdrop sheets, are mounted rotatably. While the bracket 1 receives only a supporting and counterbalancing bearing, the bracket 2 contains drive means (not shown) which will be described herein after for the individual rollers 4 to 9. Transverse rods 10, 11, 12, 13, 14 and 15 (FIG. 2) are provided at the free ends of each of the backdrop sheets to act as a weight. Deflecting first guide rollers 16, 17, 18, 19 and 20 deflect the backdrop rearwardly to the vicinity of the supply roller 9 as will be seen from FIG. 2, which also shows deflecting second guide rollers 21–25 associated with the supply rollers 4–8, respectively, for preventing the backdrop sheets unwound therefrom from rubbing against the other supply rollers.

FIG. 3 shows a different spatial arrangement of the rollers, as shown here by the drive motors 26 to 34 connected with the right hand ends of the supply rollers, respectively. The drive motors 26 to 34 consist of low voltage d.c. motors with reduction gears and are disposed coaxially of the backdrop rollers. It will, therefore, be apparent that the offset arrangement enables the rollers to be accommodated in an idler space-saving arrangement.

FIG. 4 shows another modification of the invention in which rollers 4 to 9 are again provided with additional rollers shown on the bracket 1 with the deflecting second guide rollers 121–125. This arrangement has only one rear deflecting first guide roller 35, however, and this can be rotated by a drive in the form of a motor (not shown). A conveyor belt 37 provided with drivers 36 and tensioned via a wheel 38 runs over the deflecting roller 35 on each side beneath the brackets 1 and 2. Beneath the conveyor belt 37, on each side of the mechanism, a guide rail 39 extends forwardly and downwardly at an angle with its part 39' adapted to pivot away in a direction away from the deflecting roller 35.

The mechanism shown in FIGS. 1 and 2 operates as follows:

If the backdrop rolled on the roller 4, for example, is required for a photograph, the appropriate roller 4 is selected by a selector switch (not shown). The selector switch may be marked with appropriate colours for this purpose. The motor is thus started. As the roller 4 unwinds, the backdrop is pulled down by the weight of its transverse rod over the deflecting first guide roller 16 which then also rotates. The backdrop is rolled up again by reversing the motor polarity. A known limit switch should be provided at least for the rolling-up operation to prevent the transverse rods, for example the rod 10, from being pulled out over the deflecting rollers, for example the roller 16, owing to lack of attention.

While the backdrop in the embodiment of FIGS. 1 and 2 is already disposed in the mechanism so as to be deflected to the rear, in the embodiment of FIG. 4 the backdrop first has to be guided in that direction. In FIG. 4 it has been assumed that the backdrop of the roller 8' is required and at the same time that it is to lie on the floor.

After the correct selector switch has been actuated, the motor D of the roller 8' is started. At the same time, the motor for the rear deflecting roller 35 is switched on so that the conveyor belts 37 are moved. The transverse rod 14 moving in the direction of the conveyor belts 37 as the roller 8' unwinds now bears on the conveyor belts 37 by its extended ends and is driven by the drivers 36 as far as the deflecting roller 35. After the culmination point of the deflecting roller 35 has been passed, the drivers 36 become inoperative and the transverse rod 14 pulls the backdrop on in free fall. The extended ends of the transverse rod 14 then reach the inclined guide rails 39 and slide forwardly, while the backdrop can sag between the guide rails 39. The mechanism is not switched off until the transverse rod 14 reaches the floor and the backdrop has been unwound to an extent such that there is enough of it lying on the floor. Rolling-up takes place in the reverse sequence, the motors for the roller 8' and the deflecting roller 35 simply having the polarity reversed in synchronism. Here again, limit switches should be provided to prevent the transverse rods, for example the rod 14, from running against the brackets 1 and 2 and tearing off.

The invention is not limited solely to ceiling fixing. For example, the invention includes cases in which the individual components are secured, for example, to a frame or are disposed on a vertical wall, in which case the deflecting roller 35 (FIG. 3) or the corresponding deflecting rollers 16 to 20 (FIG. 2) must be situated in the top region of the wall.

I claim:

1. Backdrop display apparatus for displaying one of a plurality of backdrop sheets wound on separate backdrop supply rollers, respectively, comprising
    (a) stationary bracket means adapted for connection with a fixed support;
    (b) a series of parallel generally horizontally arranged backdrop supply rollers rotatably connected with said bracket means, each of said supply rollers having a backdrop sheet wound thereon:
    (c) a plurality of horizontal transverse rods secured to the free ends of said backdrop sheets, respectively, thereby to serve as weights for the ends of said sheets;
    (d) first guide roller means (20, 35) connected with said bracket means adjacent, parallel with, and at a lower elevation than a first end roller (9,9') of the series of backdrop supply rollers; and
    (e) second guide roller means including a plurality of second guide rollers (21–25; 121–125) associated with the remaining ones of said supply rollers, respectively, said second guide rollers being arranged to guide the backdrop sheets withdrawn from the said remaining supply rollers in spaced relation to the other supply rollers during the transport of the sheets to the said first guide means, respectively, whereby each backdrop sheet withdrawn from the said remaining supply rollers may be suspended from said first guide roller means adjacent the position at which a backdrop sheet may be suspended from said first end roller.

2. Apparatus as defined in claim 1, wherein said first guide roller means includes a single first guide roller (35); and further including endless conveyor means (37) extending horizontally beneath said remaining supply rollers, said conveyor means having projections (36) thereon for engaging and driving respective transverse rods in the direction of said first guide roller.

3. Apparatus as defined in claim 1, wherein successive backdrop supply rollers are contained in two vertically spaced horizontal planes, respectively.

4. Apparatus as defined in claim 2, and further including a pair of laterally spaced guide rails, each pivotally connected with the end of said bracket means adjacent said first end supply roller, said guide rails being parallel and extending angularly downwardly beneath said bracket means for slidably receiving the transverse bar associated with a backdrop being displayed.

* * * * *